United States Patent
Imada et al.

[15] 3,635,796
[45] Jan. 18, 1972

[54] METHOD FOR FERMENTING A LIQUEFIED HYDROCARBON GAS

[72] Inventors: Osamu Imada, Machida-shi; Kazuo Hoshiai, Tokyo, both of Japan; Masatami Tanaka, deceased, late of Machida-shi, Japan

[73] Assignee: Kyowa Hakko Co., Ltd., Tokyo, Japan

[22] Filed: May 26, 1968

[21] Appl. No.: 740,402

Related U.S. Application Data

[63] Continuation of Ser. No. 702,765, Feb. 23, 1968, abandoned.

[30] Foreign Application Priority Data

Jan. 26, 1967 Japan..................................42/4808

[52] U.S. Cl. ..................195/28 R, 195/82, 195/96, 195/115
[51] Int. Cl. ..........................................C12b 1/00
[58] Field of Search.................195/133, 3 H, 94, 28, 115

[56] References Cited

UNITED STATES PATENTS

| | | | |
|---|---|---|---|
| 3,010,881 | 11/1961 | Markhof............................195/133 X |
| 3,222,258 | 12/1965 | Iizuka et al.........................195/3 H X |
| 3,384,553 | 5/1958 | Caslavsky et al....................195/94 X |

*Primary Examiner*—A. Louis Monacell
*Assistant Examiner*—Seymour Rand
*Attorney*—Craig, Antonelli & Hill

[57] ABSTRACT

A continuous process for culturing a micro-organism in an aqueous nutrient medium under aerobic conditions in the presence of a liquefied hydrocarbon gas as a main carbon source which comprises adding fresh liquefied hydrocarbon gas to the culture medium, determining the concentration of dissolved liquefied hydrocarbon gas in the culture medium and controlling the addition of fresh liquefied hydrocarbon gas depending upon the detected concentration of said liquefied hydrocarbon gas in the culture medium, the supply and dissolution of the liquefied hydrocarbon gas being based on the rate of said gas consumed by the micro-organisms. Alternatively, the partial pressure of the liquefied hydrocarbon gas in the vent gas can be measured and used to control the rate of liquefied hydrocarbon gas supplied to the culture medium.

7 Claims, 1 Drawing Figure

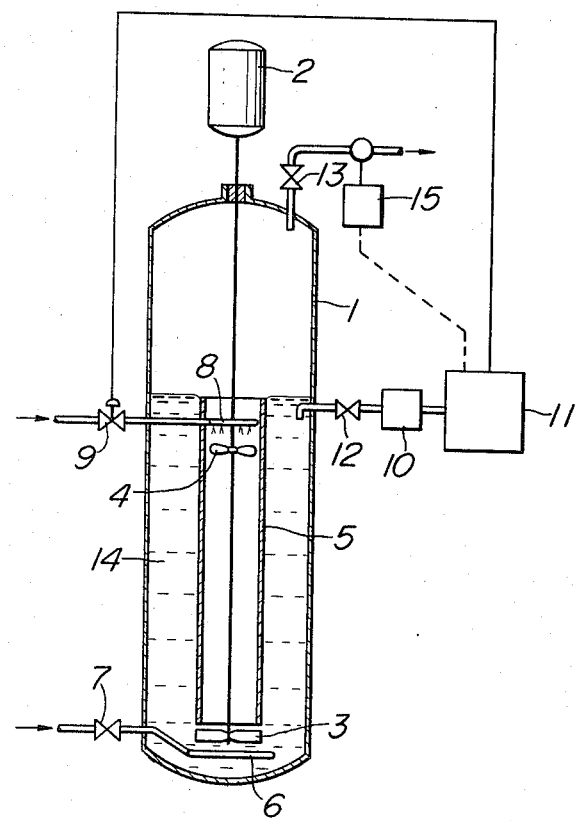
INVENTORS
OSAMU IMADA
KAZUO HOSHIAI
MASATAMI TANAKA, DECEASED
BY: ITSUKO TANAKA, ADMINISTRATRIX

METHOD FOR FERMENTING A LIQUEFIED HYDROCARBON GAS

CROSS-REFERENCE TO RELATED APPLICATION

This application is a continuation of copending application Ser. No. 702,765 which is now abandoned, filed on Jan. 23, 1968.

The present invention relates to a fermentation process for culturing micro-organisms using a liquefied hydrocarbon gas which is hereinafter referred to as "LPG" (liquefied petroleum gas). More particularly, the present invention is concerned with a process for culturing micro-organisms wherein the supply and dissolution of LPG in the culturing process is based on the rate of LPG consumption by the micro-organisms as well as the maintenance of a minimum amount of supplied and dissolved LPG which will not lower the rate of propagation of the micro-organisms or formation of the product.

When it is desired to obtain a fermentation product by culturing micro-organisms under aerobic conditions, a method has been used which generally comprises inoculating micro-organisms in a culturing liquor to which a carbon source, nitrogen source, inorganic salts and other nutrient sources as well as the substances necessary for the formation of the desired product have been previously added. Suitable conditions of temperature, pH, and other conditions are provided for forming and accumulating the desired fermentation product in the culture liquor with or without stirring while air is blown into the liquor. Among the sources of carbon which are used in the fermentation medium are water-soluble substances consisting of carbohydrates such as glucose, granular materials which can readily be made water-soluble by the enzyme produced by the micro-organisms, such as cereals, for example soybean cake, and sparingly used water-soluble oily substances such as a liquefied hydrocarbon which can be used for culturing micro-organisms by adding the necessary amount of the oily substance to the culture liquor prior to or during the culturing. The liquefied hydrocarbon generally has a very low solubility in water and the volatility thereof under ordinary fermentation conditions such as for example, temperature of about 20° to 40° C. and atmospheric pressure is also low. Thus, there is not fear of dissipation of the liquefied hydrocarbon toward the outside of the system as a result of the aeration necessary for aerobic culturing. Even if the liquefied hydrocarbon is originally in a state where oil and water are in two separate phases, the transfer and dissolution of the liquefied hydrocarbon from the oil phase into the water phase takes place as the oily substance which is dissolved in the water phase is consumed. Thus, it is not difficult to supply the liquefied hydrocarbon (oily substance) in a state utilizable for the micro-organisms and there is not any peculiarity distinguishable from the conventional and general fermentation method.

However, the situation is different with LPG. The expression "LPG" used in the present invention refers to a gaseous hydrocarbon which is not liquefied at ordinary temperatures and atmospheric pressure. LPG includes liquefied hydrocarbon gases such as methane, ethane, propane, n-butane, iso-butane, propylene, butylene, and the like. LPG has a very low solubility in water and is difficult to dissolve into the culturing liquor prior to culturing in an amount sufficient for utilization by the micro-organisms as a carbon source. Even if the solubility of the LPG in the culturing liquor is increased by compression or cooling, the dissolved LPG would be rapidly vaporized when the aeration is conducted under the ordinary culturing conditions such as ordinary culturing temperatures and atmospheric pressure. Also, the solubility becomes reduced to the concentration in equilibrium with the partial pressure of LPG in the gaseous phase. Almost all of the LPG is dissipated toward the outside of the culturing system and thus is not utilizable for the micro-organisms. Consequently, aerobic fermentation using LPG as a raw material has been practically impossible in conventional culturing systems.

An object of the present invention is to avoid the prior art disadvantages in the culturing of micro-organisms using a liquefied hydrocarbon gas.

Another object of the present invention is to provide an improved process for culturing micro-organisms using a liquefied hydrocarbon gas wherein the amount of liquefied hydrocarbon gas is effectively controlled and utilized during the culturing of the micro-organism thereby enhancing the propagation of the cells of micro-organisms with a minimum loss in raw material.

A further object of the present invention is to provide an improved process for culturing micro-organisms using a liquefied hydrocarbon gas wherein the required amount of liquefied hydrocarbon gas necessary for culturing can be sufficiently and economically supplied and the fermentation can be smoothly accomplished.

Other objects and further scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

Pursuant to the present invention, it is now possible to provide for the consumption of LPG by the micro-organisms by blowing LPG into the culturing liquor and adjusting the LPG concentration of the culturing liquor. Thus, the present invention provides a continuous process for culturing a micro-organism in an aqueous nutrient medium under aerobic conditions in the presence of a liquefied hydrocarbon gas as the main carbon source which comprises adding fresh liquefied hydrocarbon gas to the culture medium, determining the concentration of dissolved liquefied hydrocarbon gas in the culture medium and controlling the addition of fresh liquefied hydrocarbon gas depending upon the detected concentration of said liquefied hydrocarbon gas in the culture medium, the supply and dissolution of liquefied hydrocarbon gas being based on the rate of liquefied hydrocarbon gas consumer by the micro-organisms. Alternatively, the partial pressure of the liquefied hydrocarbon gas in the vent gas can be measured and used to control the rate of liquefied hydrocarbon gas supplied to the culture medium. The principle of the present invention is based on the supply and dissolution of LPG according to the rate of LPG consumption by the micro-organisms, which changes as the culturing process proceeds, as well as the maintenance of the concentration of supplied and dissolved LPG to a minimum level which will not lower the rate of propagation of the micro-organisms or the rate of formation of the product. By controlling the rate of LPG supply according to the rate of LPG consumption by the micro-organisms and by adjusting the concentration of dissolved LPG, the necessary LPG for culturing can be sufficiently and economically supplied to the fermentation medium and the fermentation can be smoothly accomplished.

Either a synthetic culture medium or a natural nutrient medium is suitable in the present invention as long as it contains the essential nutrients for growth of the micro-organism employed. Such nutrients are well known in the art and include substances such as a carbon source, a nitrogen source, inorganic compounds and the like which are utilized by the micro-organism employed in appropriate amounts. A liquefied hydrocarbon gas such as methane, ethane, propane, n-butane, iso-butane, propylene, butylene, and the like, is used as the main carbon source. Small amounts of other carbon sources may also be present, such as for example, carbohydrates such as glucose, fructose, maltose, sucrose, starch, starch hydrolyzates, molasses, etc., or any other suitable carbon source such as glycerol, mannitol, sorbitol, organic acids, glutamic acid, etc. These substances may be used either alone or in mixtures of two or more but in small amounts when compared to the primary source of carbon, that is the liquefied hydrocarbon gases mentioned above. As a nitrogen source, various kinds of inorganic or organic salts or compounds, such as urea or ammonium salts such as ammonium chloride, ammonium sulfate, ammonium nitrate, ammonium phosphate, etc., or one or more than one amino acid mixed in combination, or natural substances containing nitrogen, such as corn-steep liquor, yeast extract, meat extract, peptone, fish meal, bouillon, N-Z-Amine (trademark for a series of casein hydrolyzates), casamino acid, fish solubles, rice bran extract, ribonucleic acid, etc. may be employed. Again these substances may be used either singly or in combinations of two or more. Inorganic compounds which may be added to the culture medium include magnesium sulfate, sodium phosphate, potassium dihydrogen phosphate, potassium monohydrogen phosphate, iron sulfate or other iron salts, manganese chloride, calcium chloride, etc.

As stated above, the fermentation of the present invention may also be conducted with the use of a purely synthesized culture medium. In this case, the addition of an adequate amount of histidine in addition to the carbon source, an energy source, an inorganic nitrogen source, an inorganic substance and also, the addition of a small amount of an amino acid source, such as a mixture of amino acids in solution, casamino acid, etc., is desirable.

As is conventional in the art, growth-promoting agents such as biotin or amino acids such as glutamic acid or aspartic acid may be added to the medium.

The fermentation employed herein is conducted under aerobic conditions, such as aerobic shaking of the culture or with stirring of a submerged culture, at a temperature of about 20° to 40° C. and at a pH of about 5 to 9.

The present invention will become more fully understood from the detailed description given hereinbelow and the accompanying drawing which are given by way of illustration only and thus are not limitative of the present invention and wherein;

The drawing shows an apparatus for culturing a micro-organism according to the present invention.

Referring now to the drawing, the apparatus of the present invention comprises a fermentation tank 1 containing a culturing liquor 14 which is stirred by rotating main vanes 3 and axial flow-type auxiliary vanes 4 driven by a motor 2 provided with a speed reducer. By means of a partition cylinder 5 a circulation flow pattern is developed wherein one stream flows down within the partition cylinder and another stream flows up outside the partition cylinder. Sterilized air is injected from aeration holes of a sparger 6 through a valve 7 in an aeration pipe, and thus oxygen necessary for aerobic fermentation is supplied to the culturing liquor. Air bubbles ascend along the outside of the partition cylinder 5 and a gaseous mixture of the unutilized air and the generated carbon dioxide leaves the liquid level as a vent gas and id directed from the fermentation tank through a vent valve 13. LPG is supplied to the culturing liquor from a flow rate control valve 9 through a nozzle of gas distribution pipe 8. LPG may be supplied to the culturing liquor alone or in a mixed state together with the sterile air. LPG is partially introduced into the descending stream within the partition cylinder 5 by the axial flow type auxiliary vanes 4 in a state of fine bubbles and is dissolved and consumed by the micro-organisms while descending in the fermentation tank. Further consumption of LPG by the micro-organisms is achieved while the LPG ascends from the bottom of the tank together with the culturing liquor along the outside of the partition cylinder 5 as a result of the main rotating and stirring vanes 3. The culturing liquor automatically extracted from a sampling point provided near the liquid level between the partition cylinder 5 and wall of the fermentation tank 1 through a valve 12 is subjected to determination of the concentration of dissolved LPG by a LPG concentration detector 10. The flow rate control valve 9 is actuated by a flow rate controller 11 to control the rate of LPG supply depending upon the detected concentration of LPG in the fermentation liquor. In this way the LPG concentration in the liquor can be adjusted. In place of the detection of the concentration of dissolved LPG in the culturing liquor, the partial pressure of LPG in the vent gas which is in equilibrium with the concentration of dissolved LPG near the liquid surface can be determined and used to control the amount of fresh LPG added to the fermentation liquor. That is, a portion of the vent gas from the vent valve 13 is analyzed and the partial pressure of LPG in the vent gas is determined through the use of an LPG analyzer 15. The flow rate control valve 9 is actuated by the flow rate controller 11 according to the detected partial pressure of LPG in the vent gas to control the rate of LPG supply. In this way the concentration of LPG to the liquor can be controlled. In such a case, the rate of dissolution of supplied LPG must always exceed the rate of LPG supply sufficient to compensate for the maximum rate of LPG consumption by the micro-organisms. That is, it is always necessary to satisfy the following relationship: Rate of Dissolution of LPG > Rate of LPG ≧ Rate of LPG Consumption. The rate of dissolution of LPG is proportional to the transfer rate coefficient of LPG which in turn is a function of the pitch of axial flow-type auxiliary vanes 4 and the rate of vane revolution as well as the LPG pressure. This can be readily established by adjusting the rate of revolution of the motor 2 to a suitable value. In this manner the aerobic fermentation using LPG as a carbon source can be smoothly conducted under ordinary culturing conditions with a minimum LPG loss, and the production of the desired fermentation product can be readily carried out.

The process of the present invention is applicable to micro-organisms such as yeasts, bacteria, molds, actinomycetes and fungi. The present invention is particularly applicable to micro-organisms such as *Candida rigida* No. 113, *Candida japonica* No. 104, ATCC No. 14437, *Brevibacterium ketoglutamicum* ATCC 15587 and similar type micro-organisms.

The following examples are given merely as illustrative of the present invention and are not to be considered as limiting. Unless otherwise noted, the percentages in the application and in the examples are by weight.

EXAMPLE 1

To a fermentation tank which is 6 m. high and 2 m. in diameter as shown in FIG. 1 is supplied 10 m.³ of an aqueous solution containing 0.05 percent of $KH_2PO_4$, 0.05 percent of $K_2HPO_4$, 0.05 percent of $MgSO_4·7H_2O$, 0.01 percent of $MnSO_4·4H_2O$, 0.01 percent of $FeSO_4·7H_2O$ 0.30 percent of $(NH_4)_2SO_4$, 0.5 percent of yeast extract, and 10 mg./l. of thiamine. The solution is heated to 110° C. for 5 minutes for sterilization and aerated with 1 to 3 Nm.³/min. of sterile air. The temperature is maintained at 28° C. by passing cooling water through a cooling jacket. A device for supplying $NH_3$ gas by means of a glass electrode pH controller is provided to keep the pH at about 5.8 to 6.0 during culturing. Into the solution is inoculated 300 l. of a prepropagated solution of *Candida rigida* No. 113 (butane-assimilable micro-organism). [said micro-organism was disclosed in Jour. Agr. Chem. Soc. Japan, 40 (No. 3), pp. 119-126 (1966) and is kept in the University of Ibaragi, Japan] and the operation is started with a stirring revolution rate of 250/min. The LPG flow rate control valve is adjusted so that the partial pressure of butane gas may be kept to 0.05 percent or less in the vent gas. After about 45 hours of culturing, the propagation of cells of the micro-organisms reaches a maximum, and a culturing solution containing 25 g./l. of the cells of micro-organism is obtained. The total amount of butane supplied is 1,020 kg. and butane loss to the outside of the system is about 60 kg. Thus the utilization efficiency is 94.1 percent. The efficiency of assimilation into the cells of the micro-organism is 26.8 percent and the total yield is 25.3 percent.

In similar culturing, where the culturing is conducted by adjusting the partial pressure of butane gas in the vent gas to 0.1 percent, the amount of propagated micro-organism cells reaches 29 g./l. after about 40 hours of culturing, and the total amount of the supplied butane is 1,105 kg. and the butane loss to the outside of the system is 90 kg. Thus, the utilization efficiency is 91.9 percent. The efficiency of assimilation into the cells of the micro-organisms is 29.9 percent, and the total yield is 27.0 percent.

When the culturing is conducted under said culturing conditions without adjusting the partial pressure of butane gas in the vent gas but controlling the flow rate of supplied gas to about 22–25 kg./hour, the amount of the propagated cells of microorganism reaches 19.5 g./l. after 45 hours of culturing. The total amount of the supplied butane is 1,150 kg. and the butane loss to the outside of the system is 270 kg. Thus, the utilization efficiency of the butane is 76.5 percent, and the efficiency of the assimilation into the cells of the micro-organisms is 22.8 percent. The total yield is 17.5 percent.

EXAMPLE 2

*Brevibacterium glutamicum* ATCC 15587 is cultured in an aqueous medium containing 2.0 percent of $NH_4NO_3$, 0.05 percent of $Na_2HPO_4 \cdot 12H_2O$, 0.05 percent of $KH_2PO_4$, 0.01 percent of $MgSO_4 \cdot 7H_2O$, 0.001 percent of $MnSO_4 \cdot 4H_2O$, 0.001 percent of $FeSO_4 \cdot 7H_2O$, 0.001 percent of $ZnSO_4 \cdot 7H_2O$, 0.001 percent of $CaCl_2 \cdot 2H_2O$, 50 $\gamma$/l. of $CuSO_4 \cdot 5H_2O$, 10 $\gamma$/l. of $H_3BO_3$, 10 $\gamma$/l. of $Na_2MoO_4 \cdot H_2O$ and 0.1 percent of CSL at a pH of 7.0 using the same fermentation tank as in example 1. The medium is heated to 110° C. for 30 minutes for sterilization and then cooled to 30° C. in advance according to the conventional procedure. Further, a device for supplying aqueous ammonia is provided to the tank to keep the pH at 7.5–7.0 during culturing. After the inoculation of a prepropagated solution, culturing is conducted. The culturing is continued while adjusting the butane gas in the vent gas to 0.1 percent, and after about 70 hours the amount of propagated micro-organism reaches a stationary value, 13 i.e., g./l. of the micro-organism. The total amount of butane supplied is 277 kg., and the utilization efficiency is 90 percent. The efficiency of assimilation into the cells of the micro-organism is 50.5 percent, and the total yield is 45.4 percent.

In similar culturing, where the culturing is conducted without adjusting the partial pressure of butane gas in the vent gas, the amount of propagated micro-organism cells reaches 13 g./l. after about 70 hours, but the total amount of the supplied butane is 480 kg., and the efficiency is considerably lowered.

The invention being thus described, it will be obvious that the same may be varied in many ways; such variations are not to be regarded as a departure from the spirit and scope of the invention, and all such modifications are intended to be included within the scope of the following claims.

We claim:

1. A continuous process for culturing a micro-organism in an aqueous nutrient medium under aerobic conditions in the presence of a liquefied hydrocarbon gas as the main carbon source which comprises adding fresh liquefied hydrocarbon gas to the culture medium, determining the concentration of dissolved liquefied hydrocarbon gas in the culture medium by measuring the partial pressure of the liquefied hydrocarbon gas in the vent which is removed from the culture medium, and controlling the addition of fresh liquefied hydrocarbon gas to the medium depending upon the measurement of liquefied hydrocarbon gas in the vent, the supply and dissolution of liquefied hydrocarbon gas being based on the rate of liquefied hydrocarbon gas consumed by the micro-organisms.

2. The process of claim 1 wherein, the micro-organism is selected from the group consisting of yeasts, bacteria, molds, actinomycetes, and fungi.

3. The process of claim 1 wherein, the micro-organism is a member selected from the group consisting of *Candida rigida*, No. 113, *Candida japonica*, No. 104, ATCC No. 14437 and *Brevibacterium ketoglutamicum* ATCC 15587.

4. The process of claim 1 wherein, the liquefied hydrocarbon gas is selected from the group consisting of methane, ethane, propane, n-butane, iso-butane, propylene, and butylene.

5. The process of claim 1 wherein, the liquefied hydrocarbon gas is mixed with air, or a mixture of oxygen and air.

6. A continuous process for culturing a micro-organism selected from the group consisting of *Candida rigida*, No. 113, *Candida japonica*, No. 104, ATCC 14437 and *Brevibacterium ketoglutamicum* ATCC 15587 in an aqueous nutrient medium under aerobic conditions in the presence of a liquefied hydrocarbon gas as the main carbon source which comprises adding fresh liquefied hydrocarbon gas to the culture medium, conducting the culturing at a temperature of about 20° to 40° C. and pH of about 5 to 9, determining the concentration of dissolved liquefied hydrocarbon gas in the culture medium by measuring the partial pressure of the liquefied hydrocarbon gas in the vent which is removed from the culture medium, and controlling the addition of fresh liquefied hydrocarbon gas to the medium depending upon the measurement of liquefied hydrocarbon gas in the vent, the supply and dissolution of liquefied hydrocarbon gas being based on the rate of liquefied hydrocarbon gas consumed by the micro-organisms.

7. The process of claim 6, wherein the liquefied hydrocarbon gas is selected from the group consisting of methane, ethane, propane, n-butane, iso-butane, propylene, and butylene.

* * * * *